United States Patent
Kumar et al.

(10) Patent No.: US 10,066,630 B2
(45) Date of Patent: Sep. 4, 2018

(54) METHOD AND SYSTEM FOR METALLIC LOW PRESSURE FAN CASE HEATING

(71) Applicant: General Electric Company, Schenectady, NY (US)

(72) Inventors: Hemanth Gudibande Sathyakumar Kumar, Karnataka (IN); Bhaskar Nanda Mondal, Karnataka (IN); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 155 days.

(21) Appl. No.: 15/183,385

(22) Filed: Jun. 15, 2016

(65) Prior Publication Data

US 2017/0363094 A1   Dec. 21, 2017

(51) Int. Cl.
*G06F 19/00* (2018.01)
*G06G 7/70* (2006.01)
(Continued)

(52) U.S. Cl.
CPC .............. *F04D 27/002* (2013.01); *F02C 3/04* (2013.01); *F02K 3/06* (2013.01); *F04D 19/002* (2013.01); *F04D 19/02* (2013.01); *F04D 25/045* (2013.01); *F04D 29/329* (2013.01); *F04D 29/38* (2013.01); *F04D 29/526* (2013.01);
(Continued)

(58) Field of Classification Search
CPC .... F01D 11/24; F02C 3/04; F02C 6/08; F02C 7/14; F02C 7/185; F02C 7/85; F02K 3/06; F04D 19/002; F04D 19/02; F04D 25/045; F04D 27/002; F04D 29/329; F04D 29/38; F04D 29/526; F04D 29/584;
(Continued)

(56) References Cited

U.S. PATENT DOCUMENTS 2,446,663 A   8/1948 Palmatier
4,019,320 A * 4/1977 Redinger, Jr. .......... F01D 11/24
                                                    415/116
(Continued)

FOREIGN PATENT DOCUMENTS

EP   0102308 B1   5/1987
EP   0559420 A1   9/1993
EP   1 754 861 A2  2/2007

OTHER PUBLICATIONS

International Search Report and Written Opinion issued in connection with corresponding PCT Application No. PCT/US2017/030944 dated Sep. 12, 2017.

*Primary Examiner* — Rachid Bendidi
(74) *Attorney, Agent, or Firm* — General Electric Company; William Andes (57) ABSTRACT

A fan assembly is provided. The fan assembly includes a fan, a fan casing circumscribing the fan, and a fan casing heating system in thermal communication with the fan casing. The fan includes a hub, and a plurality of fan blades extending from the hub. Each fan blade of the plurality of fan blades terminates at a respective blade tip. A clearance gap is defined between the fan casing and the blade tips. The fan casing heating system is configured to apply heat to the fan casing when the fan is operating in a first operational mode, and remove the applied heat when the fan transitions into a second operational mode.

25 Claims, 7 Drawing Sheets

(51) Int. Cl.
  *F04D 27/00* (2006.01)
  *F04D 19/00* (2006.01)
  *F04D 19/02* (2006.01)
  *F04D 25/04* (2006.01)
  *F04D 29/32* (2006.01)
  *F04D 29/38* (2006.01)
  *F04D 29/52* (2006.01)
  *F04D 29/58* (2006.01)
  *F02C 3/04* (2006.01)
  *F02K 3/06* (2006.01)

(52) U.S. Cl.
  CPC ........ *F04D 29/584* (2013.01); *F05D 2220/36* (2013.01); *F05D 2240/35* (2013.01); *F05D 2260/208* (2013.01); *F05D 2270/40* (2013.01)

(58) Field of Classification Search
  CPC ............. F05D 2240/35; F05D 2240/03; F05D 2260/208; F05D 2270/40; F05D 2220/36
  See application file for complete search history.

(56) References Cited

U.S. PATENT DOCUMENTS

| | | | |
|---|---|---|---|
| 4,441,314 A | 4/1984 | Fitton | |
| 4,493,184 A | 1/1985 | Nikkanen et al. | |
| 4,513,567 A | 4/1985 | Deveau et al. | |
| 4,525,998 A * | 7/1985 | Schwarz | F01D 11/24 415/116 |
| 4,782,658 A | 11/1988 | Perry | |
| 4,976,397 A | 12/1990 | Rudolph et al. | |
| 5,011,098 A | 4/1991 | McLaren et al. | |
| 8,152,457 B2 | 4/2012 | Flanagan et al. | |
| 8,434,997 B2 * | 5/2013 | Pinero | F01D 11/24 415/115 |
| 9,004,407 B2 | 4/2015 | Calder et al. | |
| 2007/0043497 A1 * | 2/2007 | Leogrande | F01D 11/24 701/100 |
| 2015/0337679 A1 | 11/2015 | Everwyn et al. | |
| 2015/0377128 A1 | 12/2015 | Copiello | |
| 2016/0123155 A1 * | 5/2016 | Mason | B21D 26/055 416/233 |

* cited by examiner

METHOD AND SYSTEM FOR METALLIC LOW PRESSURE FAN CASE HEATING

BACKGROUND

The field of the disclosure relates generally to gas turbine engines and, more particularly, to a method and system for controlling a clearance gap between fan blade tips and a metal fan casing using fan casing heating.

In at least some known aircraft engines, a fan casing fabricated from a composite material surrounds a fan including a plurality of fan blades. A clearance gap necessarily exists between tips of the fan blades and the fan casing, to avoid rub of the blade tips against the fan casing. Because composite materials are much less susceptible to thermal growth, the diameter of these composite fan casings is defined to accommodate the maximum diameter (from base to tip) of the fan blades while still maintaining a clearance gap between the blade tips and the fan casing. Accordingly, the blade tips expand to their maximum diameter during takeoff, which restricts the minimum diameter of the fan casing. However, the fan casing remains at substantially this same minimum diameter during all other flight phases, including cruise, at which the diameter of the fan blades is reduced relative to the maximum fan blade diameter experienced during takeoff. As a result, the clearance gap, or the difference between the diameter of the fan blades and the diameter of the fan casing, during cruise is much larger than is necessary, which reduces the efficiency of the fan and, therefore, reduces the performance of the engine.

BRIEF DESCRIPTION

In one aspect, a fan assembly is provided. The fan assembly includes a fan, a fan casing circumscribing the fan, and a fan casing heating system in thermal communication with the fan casing. The fan includes a hub, and a plurality of fan blades extending from the hub. Each fan blade of the plurality of fan blades terminates at a respective blade tip. A clearance gap is defined between the fan casing and the blade tips. The fan casing heating system is configured to apply heat to the fan casing when the fan is operating in a first operational mode. The fan casing heating system is also configured to remove the applied heat when the fan transitions into a second operational mode.

In another aspect, a turbofan engine is provided. The turbofan engine includes a core engine including a multi-stage compressor, a fan powered by a low-pressure turbine driven by gas generated in the core engine, a fan casing circumscribing the fan, a fan casing heating system in thermal communication with the fan casing, and a processor. The fan includes a hub, and a plurality of fan blades extending from the hub. Each fan blade of the plurality of fan blades terminates at a respective blade tip. A clearance gap is defined between the fan casing and the blade tips. The processor is programmed to apply, using the fan casing heating system, heat to the fan casing radially outboard and axially aligned with the fan such that the fan casing expands by a predetermined amount, increasing the clearance gap to a first distance. The processor is also programmed to remove, using the fan casing heating system, the applied heat to contract the fan casing, decreasing the clearance gap to a second distance, wherein the second distance is less than the first distance.

In one aspect, a method of controlling a clearance gap between a tip of a plurality of blades of a fan and a fan casing is provided. The method includes applying heat to the fan casing radially outboard and axially aligned with the fan such that the fan casing expands by a predetermined amount, increasing the clearance gap to a first distance. The method also includes operating the fan in a first operational mode, and transitioning the fan to a second operational mode. The method further includes removing the applied heat to contract the fan casing, decreasing the clearance gap to a second distance. The second distance is less than the first distance. The method still further includes operating the fan with the clearance gap at the second distance.

In yet another aspect, a method of controlling a clearance gap between respective tips of a plurality of radially extending blades of a rotatable body and a cylindrical casing circumscribing the rotatable body is provided. The method includes applying heat to the casing radially outboard and axially aligned with the rotatable body such that the casing expands by a predetermined amount, increasing the clearance gap to a first distance. The method also includes operating the rotatable body in a first operational mode, and transitioning the rotatable body to a second operational mode. The method further includes removing the applied heat to contract the casing, decreasing the clearance gap to a second distance, wherein the second distance is less than the first distance. The method still further includes operating the rotatable body with the clearance gap at the second distance.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of the fan casing heating systems described herein provide a cost-effective method for controlling a clearance gap between fan blade tips and a fan casing (for example, a metal fan casing). Specifically, the fan casing heating system applies heat to radially outer surfaces of the metal fan casing during one operational mode, such as idle, takeoff, and/or climb. The applied heat causes radially outward deflection of the metal fan casing. When the applied heat is removed, for example during cruise, the metal fan casing contracts, reducing the clearance gap between the fan blade tips and the metal fan casing. In some embodiments, the clearance gap is reduced up to about 0.100 inch, for a fan diameter of approximately 100 inches, or 0.1% of the diameter of the fan casing. Reducing the clearance gap during cruise improves efficiency of the fan and reduces specific fuel consumption (SFC) thereby.

Figure 1:
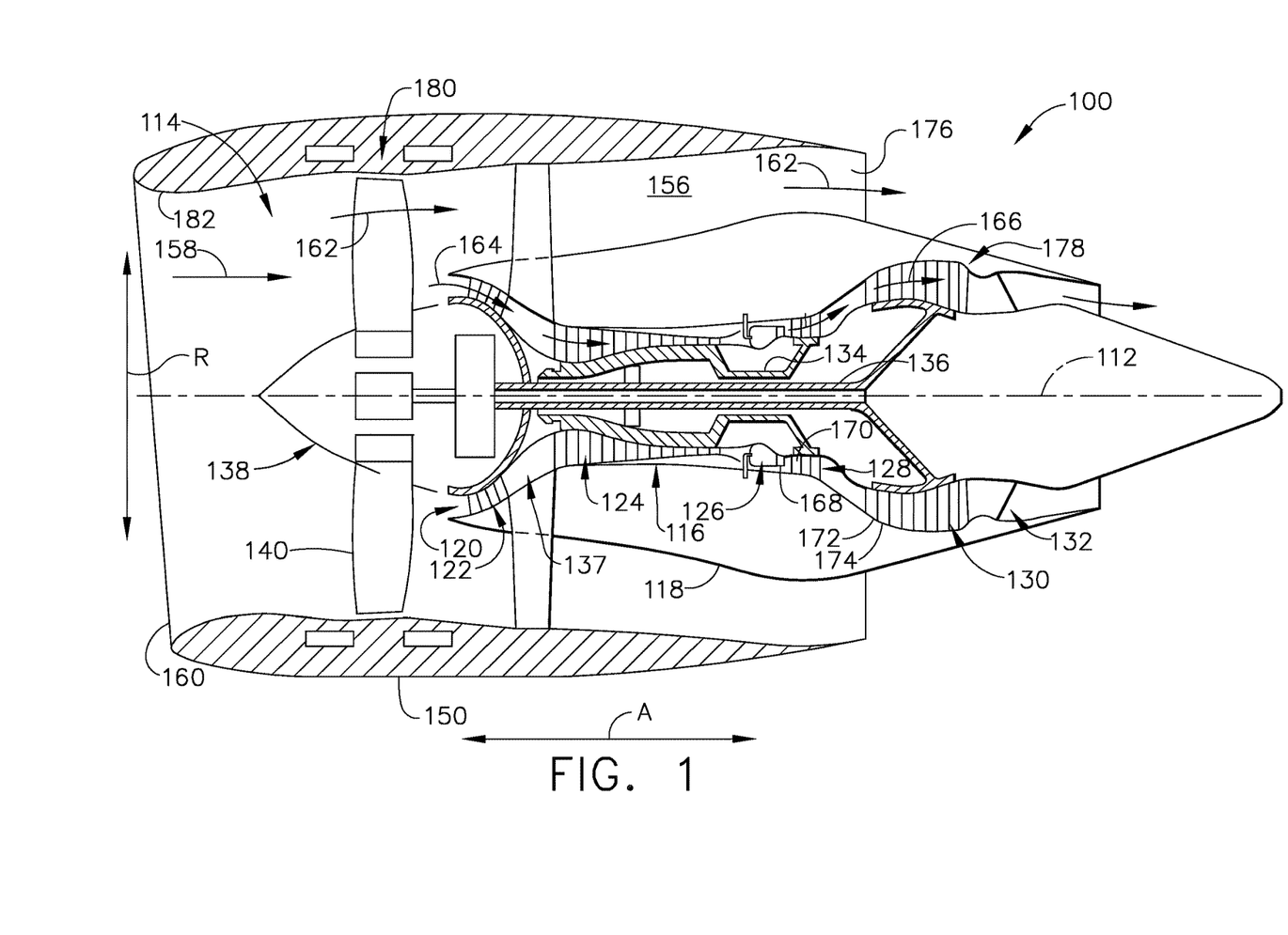
FIG. 1 is a schematic illustration of an exemplary gas turbine engine in accordance with an example embodiment of the present disclosure.

FIG. 1 is a schematic cross-sectional view of a gas turbine engine 100 in accordance with an exemplary embodiment of the present disclosure. In the example embodiment, gas turbine engine 100 is embodied in a high-bypass turbofan jet engine. As shown in FIG. 1, turbofan engine 100 defines an axial direction A (extending parallel to a longitudinal centerline 112 provided for reference) and a radial direction R. In general, turbofan engine 100 includes a fan assembly 114 and a core engine 116 disposed downstream from fan assembly 114.

In the example embodiment, core engine 116 includes an approximately tubular outer casing 118 that defines an annular inlet 120. Outer casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section, combustion section 126, the turbine section, and nozzle section 132 together define a core air flowpath 137.

During operation of turbofan engine 100, a volume of air 158 enters turbofan engine 100 through an associated inlet 160 of fan assembly 114, which includes fan 138. As volume of air 158 passes across a plurality of fan blades 140 of fan 138, a first portion 162 of volume of air 158 is directed or routed into a bypass airflow passage 156 (between core engine 116 and an annular nacelle 150) and a second portion 164 of volume of air 158 is directed or routed into core air flowpath 137, or more specifically into LP compressor 122. A ratio between first portion 162 and second portion 164 is commonly referred to as a bypass ratio. The pressure of second portion 164 is then increased as it is routed through high pressure (HP) compressor 124, and into combustion section 126, where it is mixed with fuel and burned to provide combustion gases 166.

HP turbine stator vanes 168 are coupled to outer casing 118, and HP turbine rotor blades 170 are coupled to HP shaft or spool 134. Combustion gases 166 are routed through HP turbine 128 where a portion of thermal and/or kinetic energy from combustion gases 166 is extracted via sequential stages of HP turbine stator vanes 168 and HP turbine rotor blades 170, thus causing HP shaft or spool 134 to rotate, which then drives a rotation of HP compressor 124. LP stator vanes 172 are coupled to outer casing 118, and LP turbine rotor blades 174 are coupled to LP shaft or spool 136. Combustion gases 166 are then routed through LP turbine 130 where a second portion of thermal and kinetic energy is extracted from combustion gases 166 via sequential stages of LP turbine stator vanes 172 and LP turbine rotor blades 174, which drives a rotation of LP shaft or spool 136 and LP compressor 122 and/or rotation of fan 138.

Combustion gases 166 are subsequently routed through jet exhaust nozzle section 132 of core engine 116 to provide propulsive thrust. Simultaneously, the pressure of first portion 162 is substantially increased as first portion 162 is routed through bypass airflow passage 156 before it is exhausted from a fan nozzle exhaust section 176 of turbofan engine 100, also providing propulsive thrust. HP turbine 128, LP turbine 130, and jet exhaust nozzle section 132 at least partially define a hot gas path 178 for routing combustion gases 166 through core engine 116.

In the illustrated embodiment, turbofan engine 100 further includes a fan casing heating system 180. As described further herein, fan casing heating system 180 is configured to transfer heat to a radially outward surface of a fan casing 182 surrounding fan 138. Turbofan engine 100 is depicted in FIG. 1 by way of example only, and in other exemplary embodiments, turbofan engine 100 may have any other suitable configuration including for example, an integral drive turbofan or a military purpose engine. Moreover, turbofan engine 100 may have a configuration suitable for use in aircraft applications with a pitch change mechanism.

Figure 2:
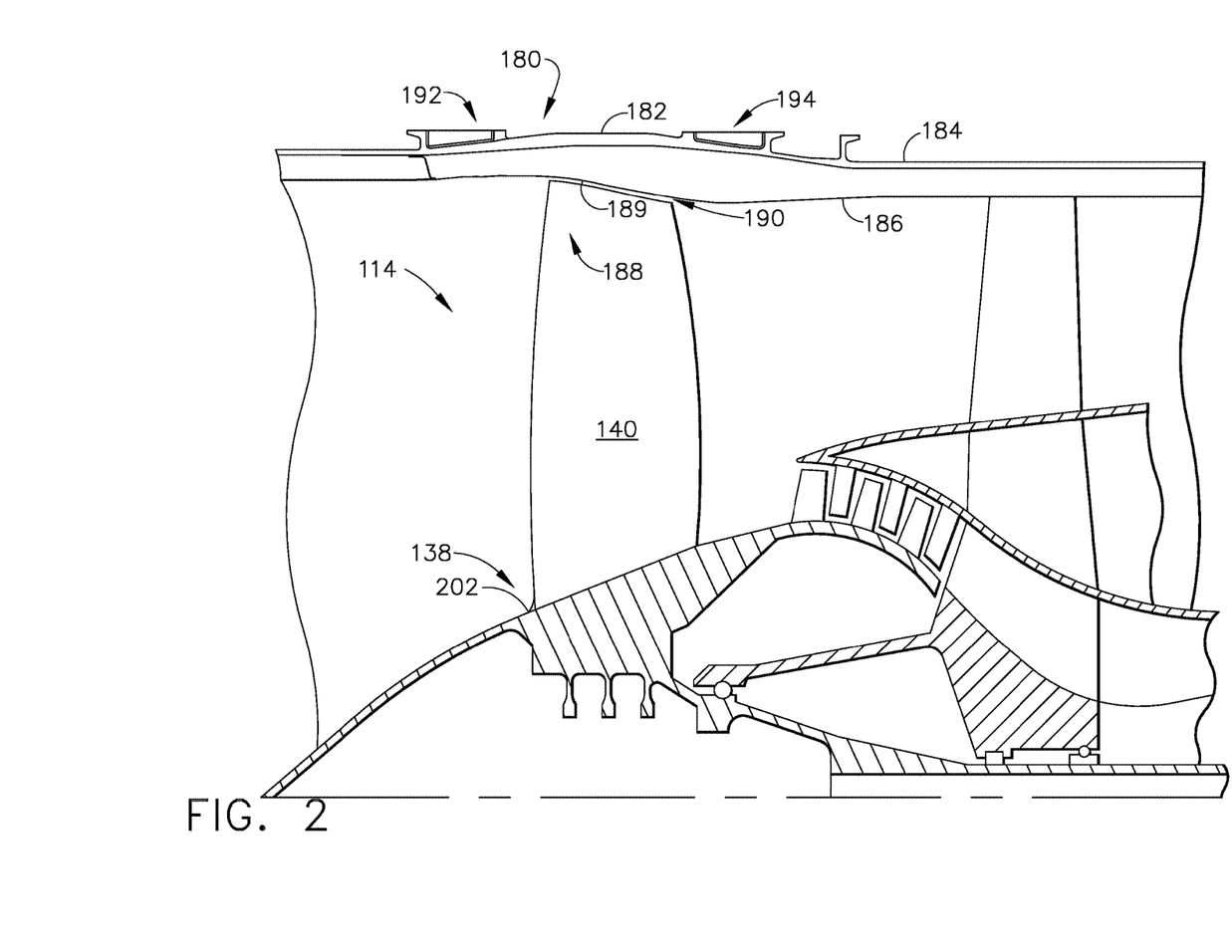
FIG. 2 is a cross-sectional view of a fan assembly of the turbofan engine shown in FIG. 1.

FIG. 2 is a cross-sectional view of fan assembly 114 of turbofan engine 100 (both shown in FIG. 1). As shown, fan casing 182 surrounds fan 138. Fan casing 182 includes a radially outward surface 184 and an opposing radially inward surface 186. In the example embodiment, fan casing 182 is fabricated from a metal material, such as, but not limited to, aluminum, aluminum-lithium alloy, and/or any other metal or alloy. It should be understood that certain metals and/or alloys may be more suitable than others for use in fabricating an aircraft engine fan casing 182, due to weight concerns. In other embodiments, fan casing 182 is fabricated from another material, such as a composite material, that has a (linear) thermal expansion coefficient similar to aluminum or an aluminum alloy (e.g., within $\pm 5 \times 10^{-6} K^{-1}$). Fan casing 182 circumscribes fan blades 140, which extend radially outwardly from a fan hub 202 towards fan casing 182. Each fan blade 140 includes a blade tip 188 at a radial extent thereof. Each blade tip 188 terminates at a radially outward tip surface 189. To prevent blade rub between blade tips 188 and fan casing 182, a clearance gap 190 exists between tip surface 189 and radially inward surface 186. Although clearance gap 190 is necessary, the larger the clearance gap 190, the more inefficient the fan assembly 114, as more air is able to leak around blade tips 188. Accordingly, minimizing clearance gap 190 facilitates improving efficiency of fan assembly 114 and performance, such as specific fuel consumption (SFC), of engine 100. More particularly, minimizing clearance gap 190 at certain flight conditions or operational modes provides greater impact on efficiency and SFC. For example, minimizing clearance gap 190 during cruise may provide the greatest impact on SFC (e.g., reducing SFC by about 0.7%).

To facilitate minimizing or reducing clearance gap 190 during cruise, fan assembly 114 includes fan casing heating system 180 (shown in FIG. 1). Fan casing heating system 180 is configured to provide heating to specific portions of fan casing 182. Fan casing 182 includes a forward portion 192 axially forward of blade tips 188 and an aft portion 194 axially aft of blade tip 188. In the example embodiment, fan casing heating system 180 applies heat to fan casing 182 at forward portion 192 and aft portion 194 to cause outward deflection of fan casing 182. Because fan casing 182 is fabricated from a metal material and is therefore relatively susceptible to thermal change, heat transferred to fan casing 182 causes radially outward deflection of fan casing 182, increasing the radius (diameter) of fan casing 182. When activated during an idle flight phase or operational condition, fan casing heating system 180 thereby expands fan casing 182, which in turn increases clearance gap 190 between blade tips 188 and fan casing 182 to a first distance.

Engine power and temperature is at a maximum during a takeoff flight phase. While fan 138 is operated at a takeoff operational mode associated with the takeoff flight phase, fan blade tips 188 grow even more. Accordingly, fan casing heating system 180 may be activated or turned on before or during a takeoff or climb flight phase (e.g., before or during fan 138 is operated in a takeoff or flight operational mode). When engine 100 transitions into a cruise flight phase, fan 138 transitions into a cruise operational mode, and the temperature of fan assembly 114 decreases to a relative minimum. In response, fan casing 182 contracts to a relative minimum diameter, which decreases clearance gap 190 between blade tips 188 and the radially inner surface 186 of fan casing 182 to a second distance that is less than the first distance. Moreover, the second distance of clearance gap 190 is smaller than a clearance gap distance at cruise in composite fan casings. This reduction of the clearance gap 190 to the second distance improves efficiency of fan assembly 114, which facilitates reducing the overall specific fuel consumption (SFC) of engine 100. In some embodiments, depending at least upon a particular heating source used and/or particular parameters thereof (e.g., mass flow rate, heat capacity, temperature, etc.), clearance gap 190 may be reduced from about 0.090 inches to about 0.200 inches, for a fan 138 diameter of about 100 inches (e.g., from about 0.09% to about 0.2%). Moreover, depending at least upon the heating source used and/or the amount of reduction of the clearance gap, implementing fan casing heating system 180 may result in a reduction of SFC from about 0.10% to about 0.50%. It should be understood that the reduction in SFC may be greater than or less than about 0.10% to about 0.50%, depending on particular implementations of fan casing heating system 180.

Figure 3:
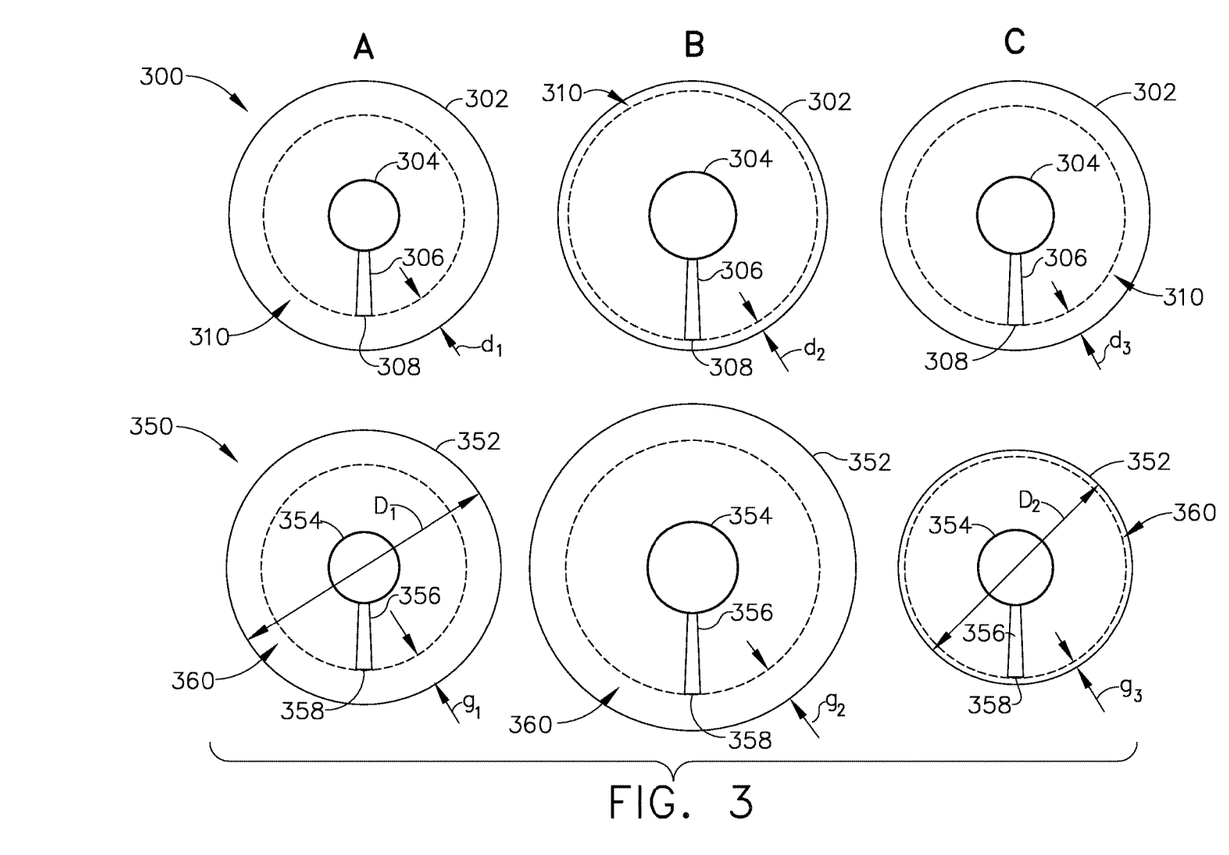
FIG. 3 is a schematic illustration of two fan assemblies under different heating schemes.

FIG. 3 is a schematic illustration of two fan assemblies under different heating schemes. More particularly, FIG. 3 illustrates one fan assembly 300 under a first heating scheme and a second fan assembly 350 under a second heating scheme. Fan assembly 300 includes a composite fan casing 302, and may accordingly be generally referred to as "composite fan assembly 300." The composite material from which composite fan casing 302 is fabricated is substantially non-susceptible to thermal changes (e.g., has a low coefficient of thermal expansion). In other words, composite fan casing 302 resists expansion and contraction even under relatively large changes in temperature. Composite fan assembly 300 also includes a fan 304, wherein fan 304 includes a plurality of fan blades 306, only one of which is shown for simplicity. Fan blades 306 may be fabricated from a metal material and/or a composite material. Fan 304 and fan blades 306 primarily expand in response to increased rotational speeds and subsequently contract in response to decreased rotational speeds. A clearance gap 310 (which may be similar to clearance gap 190) is defined between a blade tip 308 of fan blade 306 and fan casing 302.

Composite fan assembly 300 is shown operating in a first operational mode A, a second operational mode B, and a third operational mode C. In the illustrated example, operational mode A represents an idle operational mode, operational mode B represents a takeoff operational mode, and operational mode C represents a cruise operational mode. Operational mode A is associated with a low fan speed. Operational mode A may be associated with a low or substantially ambient temperature of composite fan assembly 300 (e.g., operating without fan casing heating system 180, shown in FIG. 1) or may be associated with a higher or relatively heated temperature of composite fan assembly 300 (e.g., operating with fan casing heating system 180 activated). Accordingly, clearance gap 310 is at a first distance $d_1$, as measured from blade tip 308 to fan casing 302. Operational mode B is associated with a high fan speed and high (relative maximum) temperature of composite fan assembly 300. Clearance gap 310 is at a second distance $d_2$. Due to the resistance of composite fan casing 302 to expansion, along with the growth of fan blades 306, $d_2$ is much less than $d_1$. Operational mode C is associated with a lower fan speed and lower temperature of composite fan assembly 300 than operational mode B. Fan blades 306 grow differently during operational mode B than operational mode C. However, composite fan casing 302 has substantially the same diameter throughout operational modes B and C. As a result, clearance gap 310 has increased to a distance $d_3$. Operating composite fan assembly 300 (and/or any other fan assembly) with a clearance gap of distance $d_3$ reduces efficiency and performance of that fan assembly. Moreover, it should be recognized that the diameter of composite fan casing 302 is limited by the maximum length of fan blades 306 during operational mode B, as composite fan casing 302 must be large enough to accommodate fan blades 306 while maintaining clearance gap 310 at least at distance $d_2$.

Fan assembly 350 includes a metal fan casing 352, and may accordingly be generally referred to as "metal fan assembly 350." Metal fan assembly 350 may be similar to fan assembly 114 (shown in FIG. 1). Metal fan casing 352 is fabricated from a metal material that is relatively susceptible to thermal changes. In other words, metal fan casing 352 expands in response to increased temperatures and subsequently contracts in response to decreased temperatures. Metal fan assembly 350 also includes a fan 354, wherein fan 354 includes a plurality of fan blades 356, only one of which is shown for simplicity. Fan blades 356 may be fabricated from a metal material or a composite material. Fan 354 and fan blades 356 expand in response to increased rotational speeds and subsequently contract in response to decreased rotational speeds. A clearance gap 360 (which may be similar to clearance gap 190 and/or clearance gap 310) is defined between a blade tip 358 of fan blade 356 and fan casing 352. Although not shown, metal fan assembly 350 includes fan casing heating system 180.

Metal fan assembly 350 is shown operating in first operational mode A, second operational mode B, and third operational mode C, which correspond to operational modes A, B, and C as described above with respect to composite fan assembly 300. During operational mode A, fan casing heating system 180 is activated and is transferring heat to fan casing 352. Fan casing 352 is in an expanded state with a diameter $D_1$, and clearance gap 360 is at a first distance $g_1$, as measured from blade tip 358 to fan casing 352. During operational mode B, clearance gap 360 is at a second distance $g_2$. Because both metal fan casing 352 and fan blade 356 expand under the higher temperatures and higher rotational speeds associated with operational mode B, distance $g_2$ is similar to, if not substantially equivalent to, distance $g_1$. Once fan assembly 350 is transitioned to operational mode C, associated with lower fan speeds and relatively minimum temperature, fan blade 356 contracts. In addition, metal fan casing 352 contracts. More particularly, metal fan casing 352 contracts to a diameter $D_2$ that is less than the initial diameter $D_1$ associated with operating under operational mode A. Accordingly, clearance gap 360 is reduced to a third distance $g_3$, which is less than either distance $g_1$ or distance $g_2$.

Moreover, distance $g_3$ is less than distance $d_3$, the clearance gap distance of clearance gap 310 operating under operational mode C. Therefore, metal fan assembly 350 may operate more efficiently and exhibit improved performance over, for example, composite fan assembly 300. In some embodiments, metal fan assembly 350 may exhibit a performance benefit of reduced SFC up to about 0.7%. Moreover, in some cases, fabrication of metal fan casing 352 may provide a manufacturing cost reduction, compared to fabrication of composite fan casing 302. In addition, metal fan casing 352 may be thinner than composite fan casing 302, which allows for an increase in diameter of fan 354 by about 1% (e.g., about 1 inch, for a fan 354 with a diameter of 100 inches). This diameter increase may provide an additional reduction in SFC of about 0.3%.

It should be understood that although the operational modes have been described herein as being associated with idle, cruise, takeoff, and/or climb, the operational modes may correspond to different flight, mission, and/or other phases. For example, where a fan casing is implemented on a variable pitch fan, the operational modes of a fan assembly may correspond to different phases.

Figure 4:
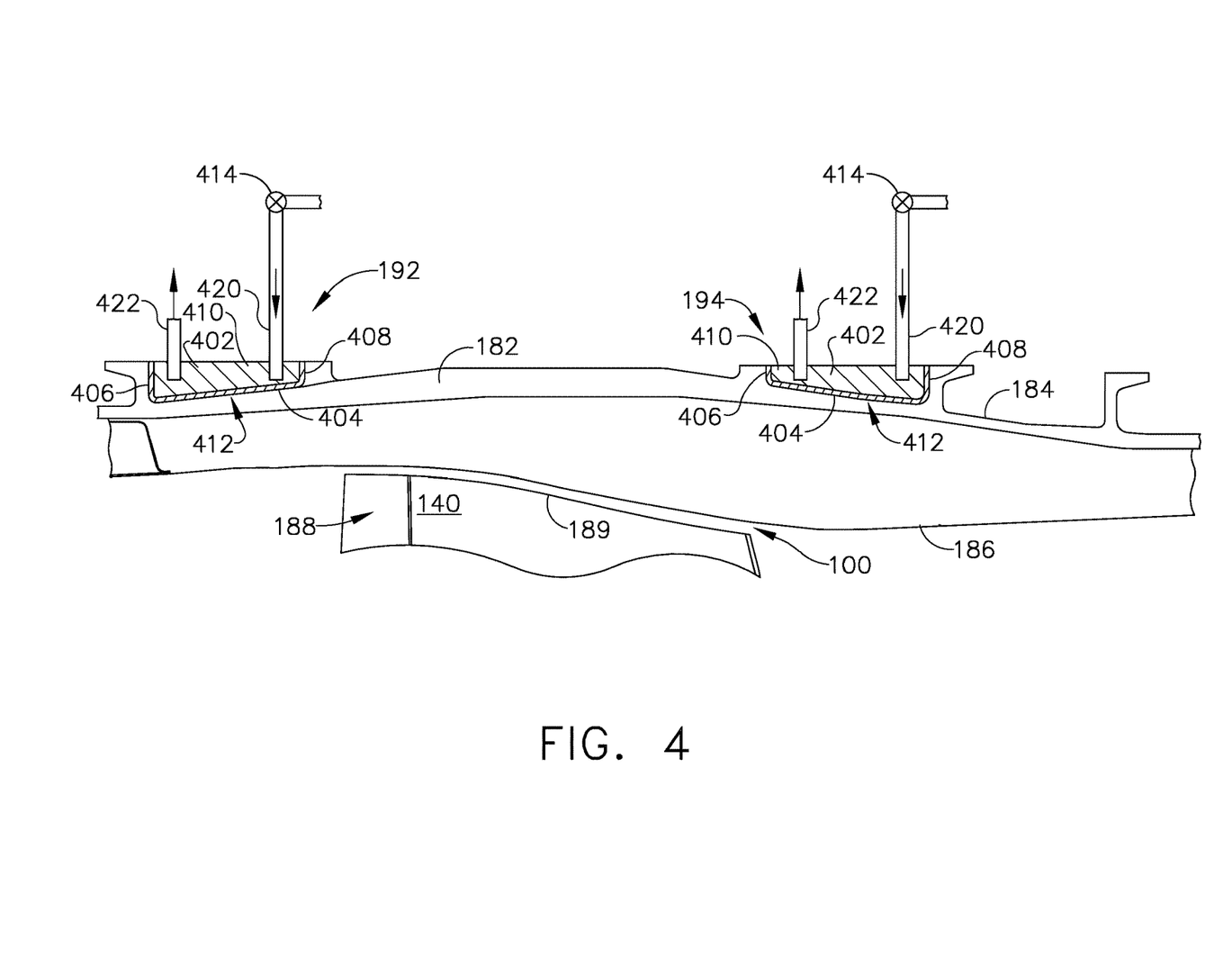
FIG. 4 is an expanded view of a fan casing of the fan assembly shown in FIG. 2 including one example embodiment of a fan casing heating system.

FIG. 4 is an expanded view of fan casing 182 of fan assembly 114 including one example embodiment of fan casing heating system 180 (all shown in FIG. 1). In the example embodiment, fan casing heating system 180 includes one or more heating fluid conduits 402 in fluid and thermal communication with the radially outward surface 184 of fan casing 182. More particularly, in the illustrated embodiment, heating fluid conduits 402 include a base wall 404 and opposing side walls 406, 408 defined by forward portion 192 or aft portion 194 of fan casing 182. Heating fluid conduits 402 further include an outer wall 410 coupled to side walls 406, 408. Base wall 404, side walls 406, 408, and outer wall 410 define a cavity 412 therein. Cavity 412 is configured to hold a working fluid therein for heating of fan casing 182. The working fluid may include bleed air from the booster compressor, bleed air from the high-pressure compressor, engine oil, nacelle anti-ice fluid, and/or any other working fluid that is incrementally higher in temperature relative to a temperature of fan casing 182.

A single heating fluid conduit 402 may extend around a large portion of and/or substantially an entirety of the circumference of fan casing 182. Alternatively, a plurality of heating fluid conduits 402 may be spaced circumferentially about fan casing 182 (e.g., four conduits 402 each in flow communication with one quadrant of the circumference of fan casing 182).

Each heating fluid conduit 402 is in fluid communication with an inlet 420 and an outlet 422. Inlet 420 is in fluid communication with a fluid heat source 424 from which hot working fluid may be channeled. Inlet 420 may be spaced aft or forward of outlet 422. Additionally or alternatively, inlet 420 may be radially spaced from outlet 422. The hot working fluid is channeled through inlet 420 into heating fluid conduit 402. Heat from the working fluid is transferred into fan casing 182, initiating outward deflection/expansion of fan casing 182, as described herein. Relatively cold (relative to the initial temperature of the working fluid) working fluid is channeled through outlet 422 out of heating fluid conduit 402. The working fluid may be pressurized to ensure entry of hot working fluid into heating fluid conduit 402 through inlet 420 and exit of cold working fluid from heating fluid conduit 402 through outlet 422.

In some embodiments, fan casing heating system 180 is activated or turned on by initiating the channeling of hot working fluid into heating fluid conduit 402. Conversely, fan casing heating system 180 is deactivated or turned off by reducing and/or ceasing the channeling of hot working fluid into heating fluid conduit 402 and/or draining any remaining cold working fluid therefrom. Accordingly, fan casing heating system 180 may include one or more valves 414 or other mechanisms configured to control flow of working fluid into and/or out of heating fluid conduits 402. For example, to activate fan casing heating system 180, valves 414 are opened to permit flow of the hot working fluid through inlets 420. To deactivate fan casing heating system 180, valves 414 are closed to shut off flow of the working fluid through inlets 420.

Figure 5:
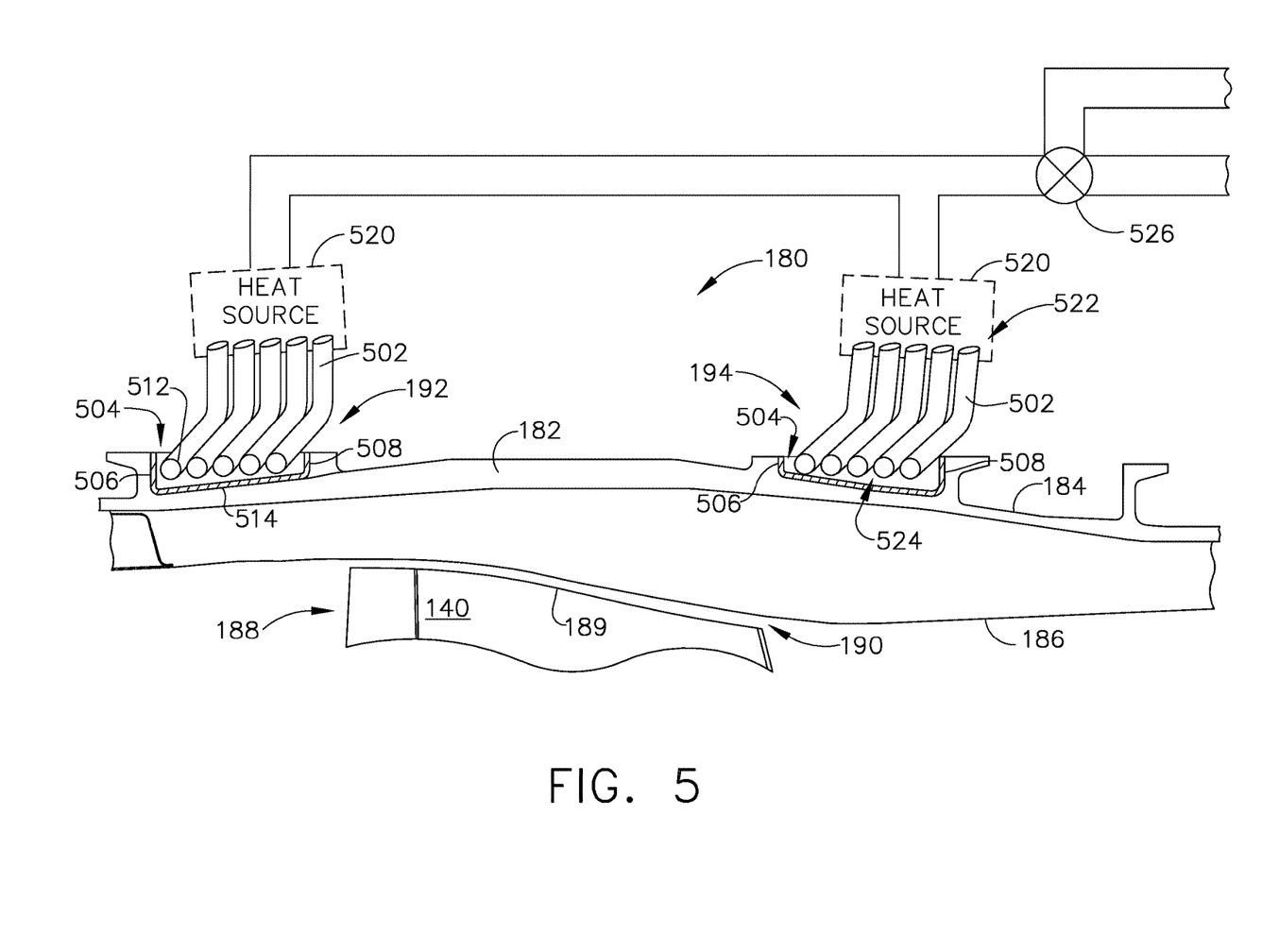
FIG. 5 is an expanded view of the fan casing of the fan assembly shown in FIG. 2 including a second example embodiment of a fan casing heating system.

FIG. 5 is an expanded view of fan casing 182 of fan assembly 114 including another example embodiment of fan casing heating system 180 (all shown in FIG. 1). In the example embodiment, fan casing heating system 180 includes a plurality of heat pipes 502. In the illustrated example, heat pipes 502 are positioned in a side-by-side parallel array inside of an open tray 504, which is defined in the radially outer surface 184 of fan casing 182. More particularly, tray 504 is defined by forward portion 192 or aft portion 194 of fan casing 182. Tray 504 has an inner panel 506 and a peripheral wall 508 defining an opening. It is noted that the axial and radial extent of fan casing heating system 180 can be varied as need to suit a particular application. For example, a greater number of heat pipes 502 could be used so that fan casing heating system 180 extends circumferentially around a larger portion and/or substantially an entirety of the circumference of fan casing 182. Alternatively, there may be a plurality of trays 504 or other heat sink zones spaced circumferentially about fan casing 182.

Each heat pipe 502 has an elongated outer wall 512 with closed ends which defines a cavity 514 therein. Heat pipes 502 are filled with a wick or other capillary structure (not shown) and hold a working fluid. Various working fluids, such as gases, water, organic substances, and low-melting point metals are known for use in heat pipes. In some embodiments, a non-flammable working fluid, such as water or $CO_2$, is used.

In some embodiments, heat pipes 502 may be "potted" in a filler material (not shown) disposed inside tray 504. Any material which will maintain its shape and which has relatively high thermal conductivity may be used, such as metals, conductive pastes, or plastics. The filler material acts to hold heat pipes 502 in the desired position and spacing. The filler material provides a heat transfer path from heat pipes 502 to radially outer surface 184 of fan casing 182. Moreover, in some embodiments, tray 504 may include an outer wall (not shown) opposite inner panel 506, the outer wall configured to ensure heat transfer from heat pipes 502 radially inwardly to fan casing 182, rather than radially outwardly. For example, the outer wall may be fabricated from a non-thermally conductive material. Additionally, in some embodiments, tray 504 and/or heat pipes 502 may be covered with an insulating material.

Heat pipes 502 are highly efficient at transferring heat. For example, their effective thermal conductivity is several orders of magnitude higher than that of solid copper. The number, length, diameter, shape, working fluid, and other performance parameters of heat pipes 502 are selected to achieve the desired degree of heat transfer during engine operation. The operation of heat pipes 502 are described in more detail below.

One end of each heat pipe 502 is disposed inside of and/or adjacent to a heat source 520. Heat source 520 may include, for example, a heat exchanger. This portion of heat pipes 502 is designated as a "hot" or "source" end 522 of heat pipes 502. The opposing end of each heat pipe 502 is disposed in a tray 504, as described above. This portion of heat pipes 502 is designated as a "cold" or "sink" end 524 of heat pipes 502. It is noted that terms "hot" and "cold", when used in relation to heat pipes 502, describe the positioning of heat pipes 502 in areas of relatively high or low temperature, and are not related to any particular aspect of the structure of heat pipes 502 themselves. In one embodiment, all heat pipes 502 (i.e., heat pipes 502 in forward portion 192 and heat pipes 502 in aft portion 194) are in thermal communication with the same heat source 520. In another embodiment, heat pipes 502 in forward portion 192 are in thermal communication with a different heat source 520 than heat pipes 502 in aft portion 194.

In operation, engine oil that has absorbed heat from various parts of engine 100 (shown in FIG. 1) is circulated into heat source 520, where it heats hot ends 522 of heat pipes 502. The working fluid within heat pipes 502 absorbs that heat and evaporates. The vapor generated then travels through cavities 514, and condenses at cold ends 524 of heat pipes 502, thereby transferring heat to cold ends 524. A wick or other capillary structure that extends from one end of a heat pipe 502 to the other transports the condensed liquid back to hot end 522, for example, by capillary action, thereby "completing the circuit." The heat in cold ends 524 is transferred to fan casing 182, for example, through a filler material and/or through radially outer surface of fan casing 182. The number, size, and location of heat pipes 502 can be selected to provide heat removal and transfer as needed. Furthermore, water may be used as the heat pipe working fluid to ensure a non-toxic and non-flammable design that avoids circulation of oil throughout fan assembly 114. Moreover, in at least some embodiments, heat source 520 is located remotely from fan casing 182, such that fan casing 182 is eliminated as a fire zone.

In some embodiments, fan casing heating system 180 is activated or turned on by coupling hot ends 522 of heat pipes 502 to heat source 520. Conversely, fan casing heating system 180 is deactivated or turned off by decoupling hot ends 522 of heat pipes 502 from heat source. Additionally or alternatively, fan casing heating system 180 is activated by coupling cold ends 524 to fan casing 182, and fan casing heating system 180 is deactivated by decoupling cold ends 524 from fan casing 182. Accordingly, fan casing heating system 180 may include one or more actuators, plates, levers, pulleys, gears, connectors, and/or other mechanisms to suitably couple/decouple hots ends 522 to/from heat source 520 and/or to couple/decouple cold ends 524 to/from fan casing 182. Additionally or alternatively, heat source 520 is deactivated using a bypass valve 526 to prevent flow of heat (e.g., engine oil, bleed air) to heat source 520.

Figure 6:
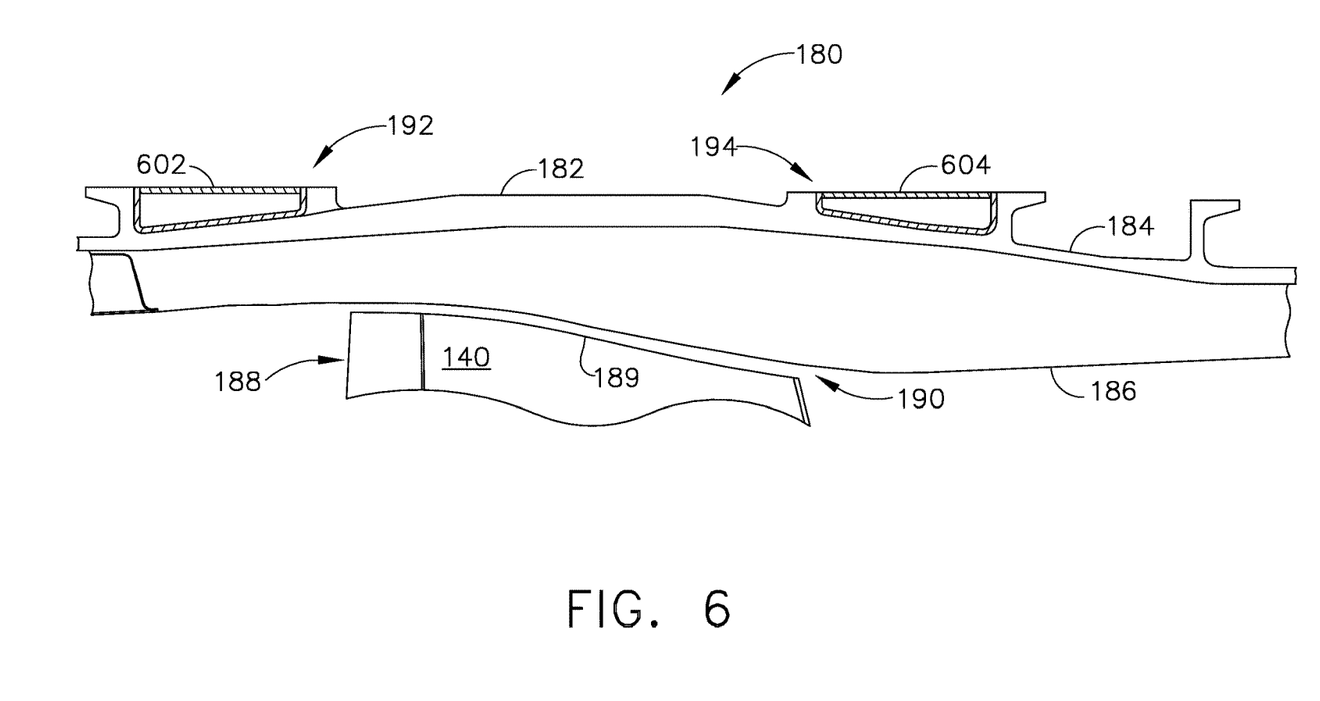
FIG. 6 is an expanded view of the fan casing of the fan assembly shown in FIG. 2 including a third example embodiment of a fan casing heating system.

FIG. 6 is an expanded view of the fan casing of the fan assembly shown in FIG. 2 including a third example embodiment of a fan casing heating system 180. In the example embodiment, fan casing heating system 180 includes at least one electric heater 602, 604. In the illustrated embodiment, one electric heater 602 is positioned within and/or adjacent to forward portion 192, and another electric heater 604 is positioned within and/or adjacent to aft portion 194. In some embodiments, one electric heater 602 and/or 604 extends circumferentially around substantially an entirety of fan casing 182. In other embodiments, a plurality of electric heaters 602 may be spaced around the circumference of fan casing 182 within and/or adjacent to forward portion 192, and/or a plurality of electric heaters 604 may be spaced around the circumference of fan casing 182 within and/or adjacent to aft portion 194. Electric heaters 602, 604 may include any electric heating components. The specific details of the physical components of electric heaters 602, 604 will not be discussed further herein. Electric heaters 602, 604 apply heat to the radially outer surface 184 of fan casing 182, causing radially outward deflection thereof, as described herein. Fan casing heating system 180 may be easily activated and/or deactivated by turning electric heaters 602, 604 on and/or off, respectively.

It should be understood that additional embodiments of fan casing heating system 180 may be contemplated and implemented within the scope of the present disclosure. For example, fan casing heating system 180 may include one or more magnetic heaters, electromagnetic heaters, and/or any other heating components disposed about fan casing 182. Moreover, it should be understood that fan casing heating system 180 may include combinations of any of the above-described heating components. For example, in one alternative embodiment, forward portion 192 may be occupied by the heat pipe implementation described with respect to FIG. 5, and aft portion 194 may be occupied by the heating fluid conduit implementation described with respect to FIG. 4.

Figure 7:
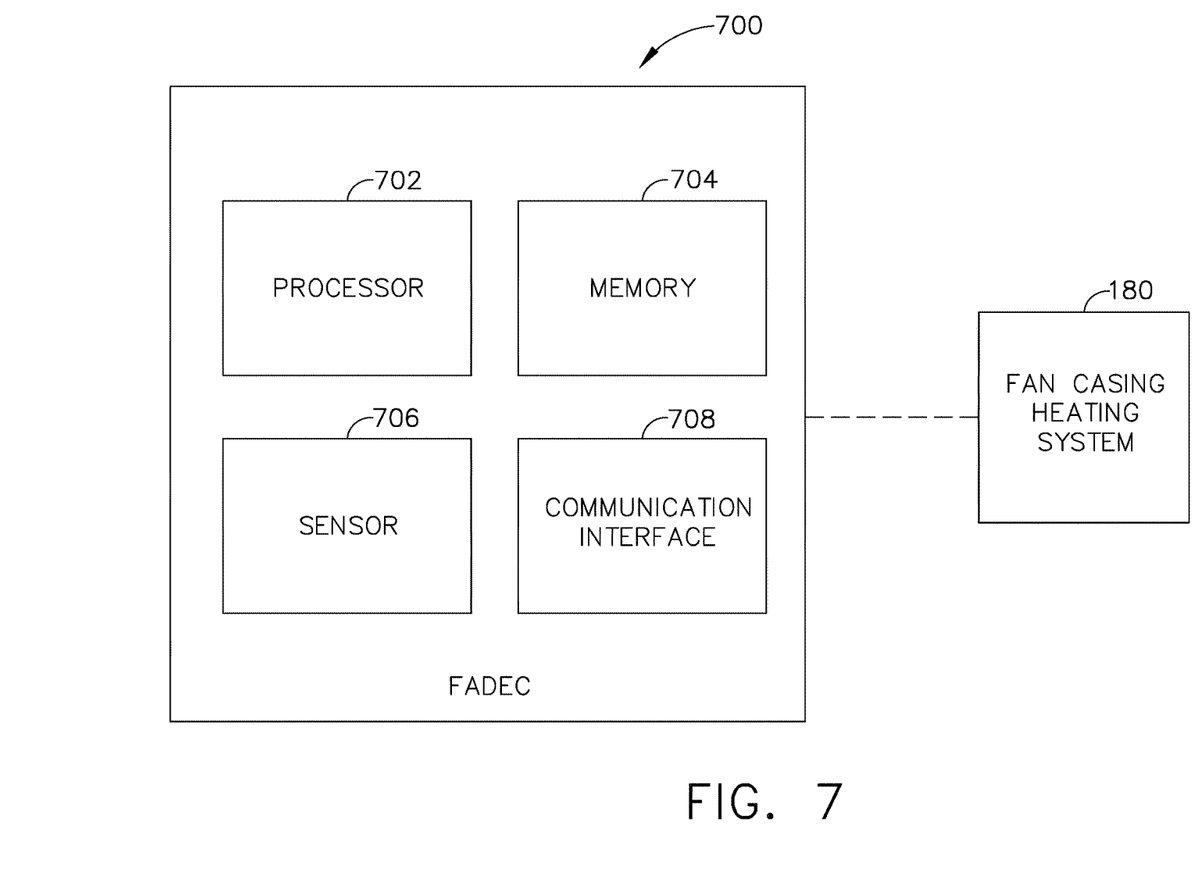
FIG. 7 is a schematic diagram of an example embodiment of a FADEC in communication with a fan casing heating system.

FIG. 7 is a schematic diagram of an example embodiment of a FADEC 700 onboard an aircraft housing engine 100. In the example embodiment, FADEC 700 is in communication with and/or integral to fan casing heating system 180 (shown in FIG. 1), such that fan casing heating system 180 may receive instructions therefrom. FADEC 700 includes a processor 702, a memory 704, at least one sensor 706, and a communication interface 708. In alternative embodiments, FADEC 700 and/or components thereof may include and/or be integral to another aircraft computing system.

Processor 702 is configured to execute computer-implementable instructions, for example, stored in memory 704. These instructions include programming directing when FADEC 700 should activate/turn on and deactivate/turn off fan casing heating system 180. These instructions may also include programming directing FADEC 700 to perform a plurality of other engine and/or aircraft control functions, such as operating various engine components according to flight phase. For example, FADEC 700 may use processor to perform control functions directing fan 138 (shown in FIG. 1) to operate in various operational modes according to corresponding flight phases. Processor 702 may include one or more processing units, for example, a multi-core configuration, for executing instructions. Memory 704 is any device allowing information such as executable instructions and/or written works to be stored and retrieved. Memory 704 may include one or more computer-readable media. Memory 704 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Sensor 706 is configured to measure or sense at least one parameter associated with engine 100. More particularly, in the example embodiment, sensor 706 is a temperature sensor configured to measure an ambient temperature of an environment of engine 100. Communication interface 708 is communicatively couplable to a remote device, such as fan casing heating system 180 and/or other aircraft control systems. Communication interface 708 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

In one embodiment, memory 704 is configured to store a threshold temperature. Processor 702 is configured to interpret signals from sensor 706 to determine the ambient temperature and compare the ambient temperature to the stored threshold temperature. When the measured ambient temperature of the environment around the aircraft is at or below the threshold temperature, processor 702 is configured to automatically communicate instructions via communication interface 708 to turn on fan casing heating system 180. In another embodiment, sensor 706 includes a distance sensor. Sensor 706 is positioned, for example, at fan casing 182, and measures clearance gap 190 (both shown in FIG. 1). Memory 704 is configured to store a threshold distance. Processor 702 is configured to interpret signals from sensor 706 to determine the clearance gap 190. When clearance gap 190 is at or below the threshold distance, processor 702 is configured to automatically communication instructions via communication interface 708 to turn on fan casing heating system 180. It should be understood memory 704 may store additional and/or alternative parameters, such as a flight condition or operational mode during which fan casing heating system 180 should be activated, such as during an idle, takeoff, climb, and/or descent operational mode, and/or a flight condition or operational mode during which fan casing heating system 180 should be deactivated, such as during a cruise operational mode.

Moreover, although FADEC 700 is configured to automatically activate and/or deactivate fan casing heating system 180, FADEC 700 may be further configured to transmit manual commands to fan casing heating system 180, for example, from a pilot or other operator, as long as those manual commands are not in contradiction with the automatic FADEC commands. For example, a pilot may not be able to deactivate fan casing heating system 180 during an idle operational mode when the measured ambient temperature is below the threshold temperature, but may be able to activate fan casing heating system 180 during an idle operational mode when the measured ambient temperature is above the threshold temperature.

The above-described fan casing heating systems provide an efficient method for heating a metal fan casing to reduce a fan clearance gap. Specifically, the above-described fan casing heating system is configured to apply heat to a radially outward surface of the fan casing at specific portions of the fan casing (e.g., axially forward and aft of fan blades) to cause radial deflection of the fan casing during certain operational modes. Once the heat is removed from the fan casing, the fan casing contracts to reduce a clearance gap in the fan.

The above-described embodiments of a method and system of heating a metal fan casing facilitates improving efficiency and performance of a fan assembly, and, more specifically, reducing specific fuel consumption (SFC) of an engine containing such a fan assembly. Moreover, thinner metal fan casings may provide the opportunity for reduced manufacturing costs and additional SFC reductions due to the availability for increased fan diameter.

Exemplary embodiments of fan casing heating systems are described above in detail. The fan casing heating systems, and methods of operating such systems and component devices are not limited to the specific embodiments described herein, but rather, components of the systems and/or steps of the methods may be utilized independently and separately from other components and/or steps described herein. For example, the methods may also be used in combination with other systems requiring and/or benefitting from a heating system that expands a component during one operational mode to enable later contraction of the component during a second operational mode, and are not limited to practice with only the systems and methods as described herein. Rather, the exemplary embodiment can be implemented and utilized in connection with many other machinery and/or industrial applications (e.g., wind, gas, etc.), including, but not limited to, compressors, turbines, other rotatable engine stages, and/or any propeller, impeller, or other rotatable body or system including a plurality of radially extending blades circumscribed by a substantially cylindrical casing.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fan assembly comprising:
    a fan comprising:
        a hub; and
        a plurality of fan blades extending from said hub, each fan blade of said plurality of fan blades terminating at a respective blade tip;

a fan casing circumscribing said fan, wherein a clearance gap is defined between said fan casing and said blade tips; and a fan casing heating system in thermal communication with said fan casing, said fan casing heating system configured to:

apply heat to said fan casing when said fan is operating in a first operational mode as instructed by a full authority digital engine control (FADEC) having a processor programmed to execute computer-implementable instructions incorporated therein; and remove the applied heat when said fan transitions into a second operational mode as instructed by the FADEC.

2. The fan assembly of claim 1, wherein said fan casing heating system is further configured to apply heat to a radially outward surface of said fan casing until said fan casing expands a predetermined amount, increasing the clearance gap to a first distance.

3. The fan assembly of claim 2, wherein the first distance is greater than 0.0004 inches per inch of a diameter of said fan casing.

4. The fan assembly of claim 3, wherein the first distance is greater than 0.0007 inches per inch of the diameter of said fan casing.

5. The fan assembly of claim 1, wherein said fan casing heating system further comprises one or more heat pipes, and wherein said fan casing heating system is further configured to:

apply heat to said fan casing as instructed by the FADEC using said one or more heat pipes by thermally coupling said one or more heat pipes to at least one of said fan casing and a heat source;

remove the applied heat as instructed by the FADEC by thermally decoupling said one or more heat pipes from at least one of said fan casing and said heat source.

6. The fan assembly of claim 1, wherein said fan casing heating system further comprises at least one electric heater.

7. The fan assembly of claim 1, wherein said fan casing heating system further comprises at least one heating fluid conduit.

8. The fan assembly of claim 1, wherein said fan assembly is coupled to an aircraft gas turbine engine.

9. The fan assembly of claim 8, wherein the second operational mode includes a cruise operational mode, and wherein the first operational mode includes at least one of an idle operational mode, a takeoff operational mode, and a climb operational mode.

10. A turbofan engine comprising:
a core engine including a multistage compressor;
a fan powered by a low-pressure turbine driven by gas generated in said core engine, said fan comprising:
a hub; and
a plurality of fan blades extending from said hub, each fan blade of said plurality of fan blades terminating at a respective blade tip;
a fan casing circumscribing said fan, wherein a clearance gap is defined between said fan casing and said blade tips;
a fan casing heating system in thermal communication with said fan casing; and
a processor programmed to:
apply, using said fan casing heating system, heat to said fan casing radially outboard and axially aligned with said fan when said fan is operating in a first operational mode such that said fan casing expands by a predetermined amount, increasing the clearance gap to a first distance; and remove, using said fan casing heating system, the applied heat to contract said fan casing when said fan transitions into a second operational mode, decreasing the clearance gap to a second distance, wherein the second distance is less than the first distance.

11. The turbofan engine of claim 10, wherein the first distance is greater than 0.04% of a diameter of said fan casing.

12. The turbofan engine of claim 10, wherein said fan casing heating system comprises one or more electric heaters, and wherein said processor is further programmed to apply heat to said fan casing using said one or more electric heaters.

13. The turbofan engine of claim 10, wherein said fan casing heating system comprises one or more heat pipes, and wherein said processor is further programmed to apply heat to said fan casing using said one or more heat pipes.

14. The turbofan engine of claim 10, wherein said fan casing heating system comprises one or more working fluid conduits configured to channel a heated working fluid including at least one of engine oil and bleed air, and wherein said processor is further programmed to apply heat to said fan casing using said one or more working fluid conduits.

15. The turbofan engine of claim 10, wherein the second operational mode includes a cruise operational mode, and wherein the first operational mode includes at least one of an idle operational mode, a takeoff operational mode, and a climb operational mode.

16. A method of controlling a clearance gap between respective tips of a plurality of blades of a fan and a fan casing, said method comprising:

applying heat to the fan casing radially outboard and axially aligned with the fan as instructed by a full authority digital engine control (FADEC) having a processor programmed to execute computer-implementable instructions incorporated therein such that the fan casing expands by a predetermined amount, increasing the clearance gap to a first distance;
operating the fan in a first operational mode;
transitioning the fan to a second operational mode;
removing the applied heat to contract the fan casing as instructed by the FADEC, decreasing the clearance gap to a second distance, wherein the second distance is less than the first distance; and
operating the fan with the clearance gap at the second distance.

17. The method of claim 16, applying heat to the fan casing comprises applying heat to the fan casing to increase the clearance gap greater than 0.04% of a diameter of the fan casing.

18. The method of claim 17, wherein applying heat to the fan casing comprises applying heat to the fan casing to increase the clearance gap greater than 0.07% of the diameter of the fan casing.

19. The method of claim 18, wherein applying heat to the fan casing comprises applying heat to the fan casing to increase the clearance gap greater than 0.1% of the diameter of the fan casing.

20. The method of claim 16, wherein applying heat to the fan casing comprises applying heat to the fan casing using electrical heaters.

21. The method of claim 16, wherein applying heat to the fan casing comprises applying heat to the fan casing using one or more heat pipes.

22. The method of claim 16, wherein applying heat to the fan casing comprises applying heat to the fan casing using a heated working fluid including at least one of engine oil and bleed air.

23. The method of claim 16, further comprising coupling the fan casing to an aircraft gas turbine engine.

24. The method of claim 23, wherein transitioning the fan to a second operational mode comprises transitioning the fan to a cruise operational mode.

25. The method of claim 23, wherein operating the fan in a first operational mode comprises operating the fan in at least one of an idle operational mode, a takeoff operational mode, and a climb operational mode.

* * * * *